3,178,347
PSYCHO-EQUILIBRATING PYRROLIDONE CARBOXYLIC ACID
Gustave Marie Joseph Bocher, 67 Blvd. Raspail, Paris, France
No Drawing. Filed May 31, 1961, Ser. No. 113,606
Claims priority, application France, June 3, 1960, 829,133
6 Claims. (Cl. 167—65)

The present invention relates to carboxylic pyrrolidone acid and its derivatives as a new psycho-equilibrating drug.

Carboxylic pyrrolidone acid, which is a white crystalline substance highly soluble in water or alcohol is also known by the following designations: monocarboxylic pyrrolidone acid or 5 oxopyrrolidone 2 carboxylic acid or 5 pyrrolidone 2 carboxylic acid.

Its empirical formula is: $C_5H_7O_3N$.

Its structural formula is:

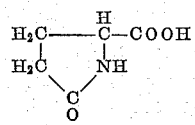

Molecular weight 129: N=10.85%; C=46.51%; N=5.42%; O=37.20%.

It is customarily obtained by dehydration of glutamic acid at a temperature in excess of 150° C.

It is identified by acidimetric titration and by measuring the nitrogen content, which must satisfy the specification given above. The derivatives used for experiments were the following:

(a) Glyceric ester of carboxylic pyrrolidone acid.
(b) The mineral and organic salts of this acid, particularly the calcium salts.

The empirical formula for glycerine pyrrolidone carboxylate is: $C_8H_{13}O_5N$, its structural formula being:

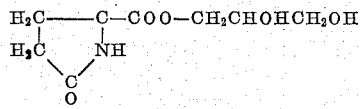

Molecular weight 203: N=6.89%; C=47.29%; H=6.40%; O=39.40%.

Calcium pyrrolidone carboxylate, which is easily soluble in water, has an empirical formula of $C_{10}H_{12}O_6N_2Ca$ and a structural formula of

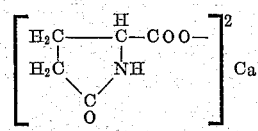

Molecular weight 296: N=9.45%; C=40.54%; H=4.05%; O=32.43%; Ca=13.51%.

Calcium pyrrolidone carboxylate is obtained by the action of carboxylic pyrrolidone acid on calcium carbonate in stoichiometric quantities.

They can both be identified by means of chemical analyses complying with the specifications detailed above. It may be noted, however, that glycerine pyrrolidone carboxylate is obtained in glycerine solution form, and that the proportion of glycerine contained in this substance must be allowed for when conducting identification tests.

Heretofore, pharmacopoeia knew of three types of compound revealing an illogical and often contradictory association, either because of the way these drugs act or because of their secondary effects.

These three drug groups are the following:
1. Sedatives.
2. Psycho-tonics, a typical example of which is glutamic acid.
3. Euphorizers, or psycho-stimulants, among which may be included the family of amphetamines.

The sedative effect of the drugs currently employed is often accompanied by a hypnotic effect which runs counter to the psycho-tonic effect; other drugs provoke psycho-asthenia which in turn leads to anxiety phenomena. In most cases, these drugs bring about a state which may be qualified as one of dulling the patient, that is to say that the latter becomes completely indifferent to his environment, a condition which is in flat contradiction to the desired psycho-tonic effect.

The psycho-tonics are all not only psychic but also psycho-motive excitants, that is to say, they produce the opposite of a sedative effect.

Euphorizers are drugs which have very powerful effects and are also psycho-motive excitants the effects of which can reach the point of toxicity and can provoke severe insomnia and often also mental confusion. These are also properties having the opposite of a sedative effect or even of a psycho-tonic effect.

Studies undertaken within the scope of the present invention have revealed that carboxylic pyrrolidone acid possesses what may be termed a psycho-equilibrating action by virtue of the fact that it combines all the following properties:

(1) In comparison with sedatives, carboxylic pyrrolidone acid improves psychism, suppresses anxiety and fights sleeplessness; however, in contradictinction to sedatives, it has no ataraxic effects so that sleep is thereby rendered physiologically normal.

(2) Like conventional psycho-tonics, carboxylic pyrrolidone acid sharpens the memory and improves intellectual efficiency, but, contrarily to the former drugs, does not produce disorderly psychic excitation.

(3) Like the euphorizers, though to a much lesser extent, carboxylic pyrrolidone acid assists physical and especially mental effort, and, contrarily to euphorizers, not only does not produce any psycho-motive excitation but may also be said to restore the neuro-psychic equilibrium to normal.

(4) Carboxylic pyrrolidone acid further possesses powerful anti-toxic properties, notably reflected by the protection it affords the nervous system and the hepatic system.

A toxicological study has shown that carboxylic pyrrolidone acid is exempt from any form of toxicity, be it acute or chronic.

The doses employed averaged 6 gr. per day per person and were often amply exceeded without disadvantage.

The properties of carboxylic pyrrolidone acid described above were ascertained by experiments made on animals and also form clinical observations.

Experiments undertaken with glycerine carboxlate have produced the following results:

(a) Experiments on albino rats have revealed its protective action against toxic substances affecting the nervous system. This was ascertained by means of intoxication tests using ammonium ion and potassium ion.

Both the results obtained and the manner in which glycerine pyrrolidone carboxylate acts are essentially at variance with the other amino acids and in particular with glutamic acid (which was used for reference purposes).

The hepatic protection it offers against ethyl alcohol was also noted.

(b) The psycho-equilibrating properties were established quite clearly and in continuous fashion in the course of clinical tests on more than fifty cases involving widely different subjects (children, adults and elderly people of both sexes, all having greatly differing clinical charts).

In addition, the experiments relating to calcium pyrrolidone carboxylate were conducted under the following conditions:

The calcium pyrrolidone carboxylate was administered in the form of drinkable phials (4 gr. per day), pills (3 gr. per day), intravenous injections (0.68 gr. per day).

The effects of the drug were checked by means of laboratory tests made on blood serum, notably by a series of electropohoreses.

This study has brought to light the favorable effects on alcoholics; indeed, it is well known that such individuals sustain hepatic repercussions which are notably reflected by a constant and considerable rise in the $\gamma$ globulin content of their blood serum. Following treatment with calcium pyrrolidone carboxylate, these patients showed a very rapid drop of the $\gamma$ globulin content down to normal, thereby confirming experiments made on animals and revealing the hepatic protection afforded in cases of intoxication by ethyl alcohol.

A considerable improvement in the psychism of the patients was noted.

By way of example, a number of clinical observations are given below:

Case A.—Philippe B . . . (age 11)

A young heterosygot. His brother is a well-balanced child and works well at school. Philippe, on the other hand, though not strictly-speaking lazy, is muddle-headed, absent-minded, agitated and wakes up screaming almost every night.

A month's treatment with glutamic acid taken at the rate of ten 0.40 gr. pills every 24 hours gave negative results. Various sedatives tried out proved ineffective or made the child sleepy almost all day.

It was then decided to give the child a teaspoonful of glycerine pyrrolidone carboxylate before each of the three principal meals. At the beginning of the third day of treatment, an appreciable improvement was noted in the boy's sleep, which became quiter. He began to wake up in the morning feeling alert and no longer sleepy as he had been when he was taking sedatives.

After a month had elapsed, his environment (brothers and parents) noticed his greatly improved behaviour: he stopped being moody and no longer evinced signs of nervousness or instability. At school, however, although his work appears to be more orderly, he does not seem to be making any progress outside of composition and drawing. His father has noted that, for the first time, he finishes the drawings he begins.

Treatment has been under way for a month and is to be continued during the school holidays.

Case B.—Marie-Christine de B . . . (age 12)

This child was examined 8 months after she had undergone extremely severe though entirely successful abdominal surgery. Despite the success of the operation, however, the child has since been nervous, asthenic and is getting poor reports from school. She also suffers from insomnia and is depressed and haunted by thoughts of death.

A month's treatment with glutamic acid administered at the rate of 4 gr. a day (ten 0.40 gramme pills every 24 hours) brought no improvement other than at school. Indeed, even this improvement at school soon stopped when the treatment was broken off. A month after the end of this treatment this young patient was given glycerine pyrrolidone carboxylate (a teaspoonful in a glass of water before each meal). A distinct improvement occurred by the end of the first week's treatment, and after a month had elapsed the child was absolutely normal: there was clear progress at school and she slept well without nightmares and was no longer haunted by the thought of death. She is gay and playful and gives the impression of a healthy, well-balanced child. The treatment was interrupted after a month and a half; a tendency for the old trouble to reappear was then noted, whereupon the treatment was resumed and continued for three months. The troubles have not reappeared since.

Case C.—Cecile G . . . (age 6)

This child showed troubles stemming from her character: nervosism, fits of temper for futile reasons, fear and agitation at night.

A month's treatment was begun at the rate of three teaspoonfuls every 24 hours. At the end of the first week of treatment, a distinct improvement was observed in the child's behaviour (quieter and less agitated) and also in her sleep, which soon reverted to normal.

It should be noted that not the slightest hint of depression was observed in this child; on the contrary, notwithstanding the fact that she had tended to be rather uncommunicative by nature, she became very gay and playful.

This little girl, who is in excellent health in every other way, has become very active not only in the games she plays but also in her conduct at school.

The administration of calcium pyrrolidone carboxylate, made chiefly to study the absorption of calcium by the organism, has produced psycho-equilibrating and antitoxic effects.

(1) A 4½ year old child suffering from osteosporosis not only had its bone structure improved but is also developing normally from the mental standpoint since the treatment was begun.

(2) Calcium pyrrolidone carboxylate, when administered to alcoholics suffering from multiple fractures, has always lead to a lowering of the $\gamma$ globulin content—an unmistakable indication of disintoxication.

The present invention is by no means limited to the therapeutic uses of carboxylic pyrrolidone acid and the two compounds thereof described above, but extends also to all other salts of this acid combined with any metal, and in particular with sodium, iron, magnesium, etc.

While I have disclosed several embodiments of the present invention, it is to be understod that these embodiments are given by example only and not in a limiting sense, the scope of the present invention being determined by the objects and the claims.

What I claim is:

1. A method of alleviating manifestations of neurotic anxiety in affected animals without producing ataraxic effects which comprises the step of administering to such animals a compound selected from the group consisting of pyrrolidone carboxylic acid, the non-toxic alkaline earth metal salts of said acid, and the glycerine ester of said acid.
2. The method, as set forth in claim 1, wherein said compound administered is the calcium salt of pyrrolidone carboxylic acid.
3. The method, as set forth in claim 1, wherein said compound administered is the monoglyceric ester of pyrrolidone carboxylic acid.
4. The method, as set forth in claim 1, wherein said compound administered is the magnesium salt of pyrrolidone carboxylic acid.
5. The method, as set forth in claim 1, in which said compound is administered to an animal.
6. The method of claim 3 wherein said compound is in a glycerine solution.

References Cited in the file of this patent
UNITED STATES PATENTS

| | | |
|---|---|---|
| 2,807,626 | Skelly | Sept. 24, 1957 |
| 2,955,073 | De Beer | Oct. 4, 1960 |
| 3,002,978 | Bocher | Oct. 3, 1961 |
| 3,035,977 | Abood | May 22, 1962 |

OTHER REFERENCES

American Drug Index (1959), pages 138, 139 and 266.